(12) United States Patent
Kamins et al.

(10) Patent No.: US 8,755,523 B2
(45) Date of Patent: Jun. 17, 2014

(54) SYSTEM FOR SECURING ACCESS TO DATA STREAMS

(75) Inventors: Josh Kamins, Elazar (IL); Stephanie Wald, Givat Zeev (IL); Yaacov Belenky, Maaleh Adumim (IL); Carmi Bogot, Maaleh Adumim (IL); Gabi Ickowicz, Jerusalem (IL); Uri Stroh, Jerusalem (IL); Abraham Wachtfogel, Dolev (IL)

(73) Assignee: Cisco Technology Inc., San Jose, CA (US)

( * ) Notice: Subject to any disclaimer, the term of this patent is extended or adjusted under 35 U.S.C. 154(b) by 1409 days.

(21) Appl. No.: 10/547,911

(22) PCT Filed: Nov. 16, 2003

(86) PCT No.: PCT/IL03/00969
§ 371 (c)(1),
(2), (4) Date: May 24, 2007

(87) PCT Pub. No.: WO2004/091132
PCT Pub. Date: Oct. 21, 2004

(65) Prior Publication Data
US 2007/0297603 A1 Dec. 27, 2007

(30) Foreign Application Priority Data
Apr. 13, 2003 (IL) .......................... 155416

(51) Int. Cl.
*H04N 7/167* (2011.01)
(52) U.S. Cl.
USPC ...... 380/210; 380/201; 380/217; 348/E5.004; 348/E7.056; 713/165

(58) Field of Classification Search
USPC .......................... 380/201, 217, 210; 713/165
See application file for complete search history.

(56) References Cited

U.S. PATENT DOCUMENTS

| 5,742,680 A | 4/1998 | Wilson |
| 5,774,548 A | 6/1998 | Bando et al. |

(Continued)

FOREIGN PATENT DOCUMENTS

| EP | 0 691 787 | 1/1996 |
| EP | 1 122 910 A1 | 8/2001 |

(Continued)

OTHER PUBLICATIONS

*Digital Transmission Content Protection Specification* vol. I (Informational Version) Hitachi, Ltd., Intel Corporation, Matsushita Electric Industrial Co., Ltd., Sony Corporation, Toshiba Corporation, Revision 1.2a ( Feb. 25, 2002) pp. 1-67.

(Continued)

*Primary Examiner* — Amare F Tabor
(74) *Attorney, Agent, or Firm* — Husch Blackwell LLP

(57) ABSTRACT

A method for protecting digital content is described. The method includes receiving compressed encrypted digital content, determining an output format based, at least in part, on all of the following: a user-requested output format; received control information; and a rule determining whether a clear compressed output format is allowed and producing output from the compressed digital content based on a result of the determining, wherein, if the rule does not allow clear compressed output format, the compressed encrypted digital content is provided in a form which prevents production of clear compressed output in the producing step. Related apparatus and methods are also described.

23 Claims, 14 Drawing Sheets

(56) References Cited

U.S. PATENT DOCUMENTS

| | | | |
|---|---|---|---|
| 5,818,934 A | 10/1998 | Cuccia | |
| 5,878,135 A | 3/1999 | Blatter et al. | |
| 5,933,500 A | 8/1999 | Blatter et al. | |
| 5,964,842 A | 10/1999 | Packard | |
| 6,016,348 A | 1/2000 | Blatter et al. | |
| 6,038,321 A | 3/2000 | Torigai et al. | |
| 6,044,157 A | 3/2000 | Uesaka et al. | |
| 6,122,379 A | 9/2000 | Barbir | |
| 6,222,924 B1 | 4/2001 | Salomaki | |
| 6,266,480 B1* | 7/2001 | Ezaki et al. | 386/94 |
| 6,286,103 B1* | 9/2001 | Maillard et al. | 726/26 |
| 6,349,138 B1 | 2/2002 | Doshi et al. | |
| 6,408,076 B1 | 6/2002 | Bewick | |
| 6,411,712 B1 | 6/2002 | Yoshida et al. | |
| 6,438,693 B1 | 8/2002 | Nakano | |
| 6,467,093 B1 | 10/2002 | Inoue et al. | |
| 6,981,141 B1* | 12/2005 | Mahne et al. | 713/165 |
| 7,069,590 B1* | 6/2006 | Malvar et al. | 726/26 |
| 7,099,472 B2* | 8/2006 | Ficco | 380/201 |
| 7,239,708 B2 | 7/2007 | England et al. | |
| 7,295,751 B2* | 11/2007 | Elberbaum | 386/1 |
| 7,334,124 B2 | 2/2008 | Pham et al. | |
| 7,336,788 B1 | 2/2008 | Hendricks | |
| 7,536,549 B2 | 5/2009 | Ishizaki | |
| 7,827,293 B2 | 11/2010 | Spicer et al. | |
| 2001/0025340 A1 | 9/2001 | Marchant | |
| 2001/0033739 A1* | 10/2001 | Oguro et al. | 386/94 |
| 2002/0006204 A1* | 1/2002 | England et al. | 380/269 |
| 2002/0019939 A1 | 2/2002 | Yamamoto et al. | |
| 2002/0034264 A1 | 3/2002 | Vigil | |
| 2002/0037081 A1 | 3/2002 | Rogoff et al. | |
| 2002/0044656 A1 | 4/2002 | Candelore | |
| 2002/0044658 A1 | 4/2002 | Wasilewski et al. | |
| 2002/0056081 A1 | 5/2002 | Morley et al. | |
| 2002/0150248 A1 | 10/2002 | Kovacevic | |
| 2002/0162105 A1 | 10/2002 | Nakano | |
| 2002/0196939 A1 | 12/2002 | Unger et al. | |
| 2002/0199206 A1 | 12/2002 | Schmitz | |
| 2003/0005449 A1 | 1/2003 | McKenna et al. | |
| 2003/0018917 A1 | 1/2003 | Brown, Sr. | |
| 2003/0021412 A1 | 1/2003 | Candelore et al. | |
| 2003/0026423 A1 | 2/2003 | Unger et al. | |
| 2003/0026424 A1 | 2/2003 | McGarrahan et al. | |
| 2003/0035540 A1 | 2/2003 | Freeman et al. | |
| 2003/0035543 A1 | 2/2003 | Gillon et al. | |
| 2003/0037343 A1 | 2/2003 | Inoue et al. | |
| 2003/0046686 A1 | 3/2003 | Candelore et al. | |
| 2003/0158813 A1 | 8/2003 | Vidich et al. | |
| 2004/0076299 A1 | 4/2004 | Wang | |

FOREIGN PATENT DOCUMENTS

| | | |
|---|---|---|
| WO | 99/16244 | 4/1999 |
| WO | 99/18729 | 4/1999 |
| WO | 01/74003 | 10/2001 |
| WO | WO 01/99422 A1 | 12/2001 |

OTHER PUBLICATIONS

"120 mm DVD-Read-Only Disk" DVD specification ECMA-267, 3$^{rd}$ Edition (2001) available on the World Wide Web at http://www.ecma-international.org/publications/files/ECMA-ST/Ecma-267.pdf.

"80 mm DVD -Read-Only Disk" DVD specification ECMA-268 3$^{rd}$ Edition (2001) available on the World Wide Web at http://www.ecma-international.org/publications/files/ECMA-ST/Ecma-268.pdf.

"120 mm DVD Rewritable Disk (DVD-RAM)" DVD specification Ecma-272, 2nd Edition (1999) available on the World Wide Web at http://www.ecma-international.org/publications/files/ECMA-ST/Ecma-272.pdf.

"XTV: Persistent End-to-End Content Protection" publication of NDS Ltd. (2002) pp. 1-8.

"Digital Video Broadcasting (DVB); Support for use of scrambling and Conditional Access (CA) within digital broadcasting systems" (1996) pp. 1-8, published by the European Telecommunications Standards Institute.

Schneier, Bruce DES algorithm as described in *Applied Cryptography, Second Edition* (1996) John Wiley and Sons, Inc., Chap. 12, pp. 265-301.

Schneier, Bruce 3DES algorithm as described in *Applied Cryptography, Second Edition* (1996) John Wiley and Sons, Inc., Chap. 12, pp. 265-301.

Schneier, Bruce "Diffie-Hellman" algorithm as described in *Applied Cryptography, Second Edition* (1996) John Wiley and Sons, Inc., Chap. 22, pp. 513-516.

Schneier, Bruce "El-Gamal" algorithm as described in *Applied Cryptography, Second Edition* (1996) John Wiley and Sons, Inc., Chap. 23, pp. 532-533.

Schneier, Bruce "Blowfish" algorithm as described in *Applied Cryptography, Second Edition* (1996) John Wiley and Sons, Inc., Chap. 14, pp. 336-339.

Schneier, Bruce " RC5" algorithm as described in *Applied Cryptography, Second Edition* (1996) John Wiley and Sons, Inc., Chap. 14, pp. 344-346.

Schneier, Bruce "IDEA" algorithm as described in *Applied Cryptography, Second Edition* (1996) John Wiley and Sons, Inc., Chap. 13, pp. 319-325.

Schneier, Bruce "RC4" algorithm as described in *Applied Cryptography, Second Edition* (1996) John Wiley and Sons, Inc., Chap. 17, pp. 397-398.

Schneier, Bruce "SEAL" algorithm as described in *Applied Cryptography, Second Edition* (1996) John Wiley and Sons, Inc., Chap. 17, pp. 398-400.

AES-FIPS Publication 197, "Announcing the Advanced Encryption Standard (AES)" published Nov. 26, 2001 by the National Institute of Standards and Technology (NIST), available on the World Wide Web at http://csre.nist.gov/publications/fips/fips197/fips-197.pdf.

Skipjack algorithm from publication "SKIPJACK and KEA Algorithm Specifications", Version 2.0; published on May 29, 1998 by the National Institute of Standards and Technology (NIST) available an the World Wide Web at http://csrc.nist.gov/CryptoToolkit/skipjack/skipjack.pdf.

Twofish algorithm as described on the World Wide Web at: http://www.schneier.com/twofish.html [retrieved on Nov. 8, 2005] pp. 1-69.

Serpent algorithm as described on the World Wide Web at: http://www.cl.cam.ac.uk/~rjal4/serpent.html [retrieved on Nov. 8, 2005].

"Guidelines for the setting up and operating of TV audience measurement peoplemeter systems" highlights from the 2nd edition of *Towards Harmonization of Television Audience Measurement Systems* published in 1993 by the EBU European Broadcasting Union in collaboration with ACT (Association of Commercial Television in Europe); EAAA (European Association of Advertising Agencies); EGTA (European Group of Television Advertising); EMRO (European Organizations for Media Research); GEAR (Group of European Audience Researchers) and WFA (World Federation of Advertisers). Mar. 29, 2010 Office Communication in connection with EP 03 772 663.9 (7 pgs.).

Sep. 26, 2011 Office Action in connection with prosecution of U.S. Appl. No. 12/930,304.

May 7, 2012 Office Communication in connection with prosecution of EP 03 772 623.9.

May 9, 2012 Office Communication in connection with prosecution of EP 12 16 1304.6.

May 11, 2012 Office Action in connection with prosecution of U.S. Appl. No. 12/930,304.

\* cited by examiner

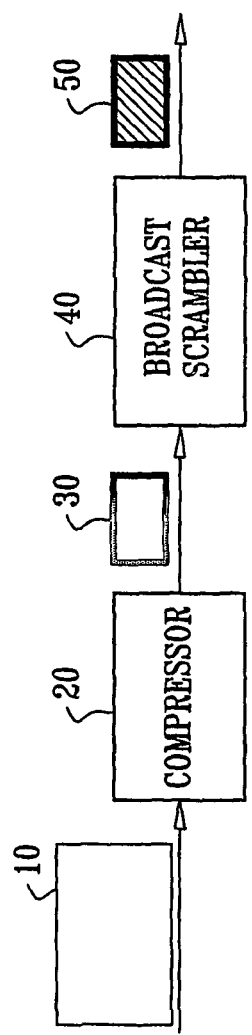
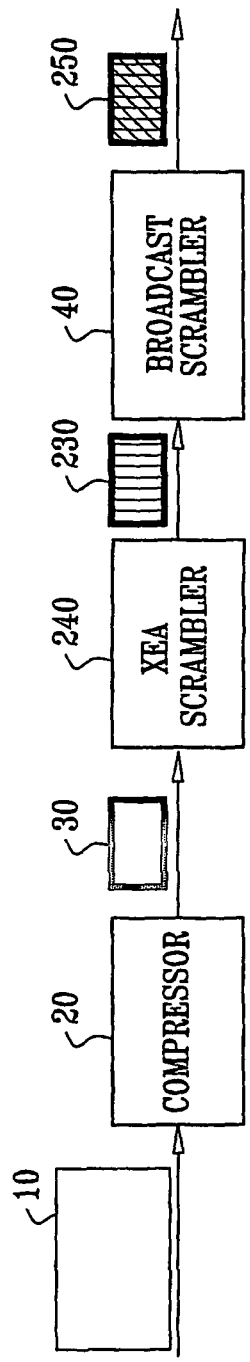

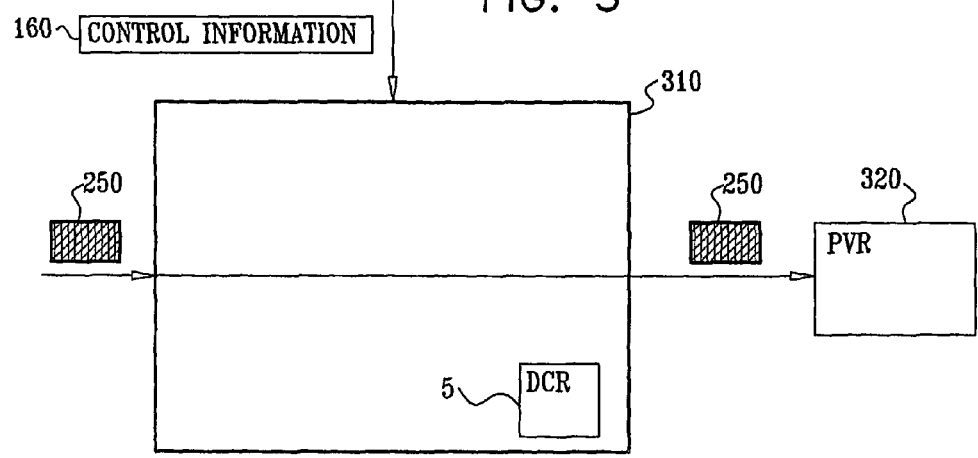
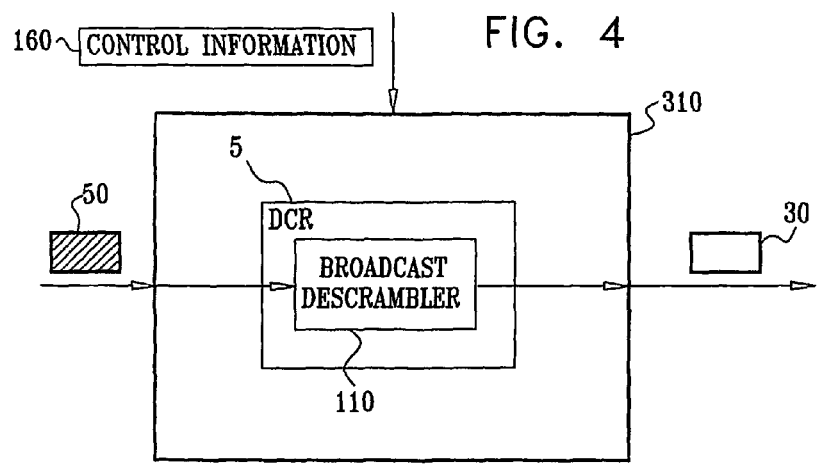

SYSTEM FOR SECURING ACCESS TO DATA STREAMS

The present application is a 35 USC §371 application of PCT/IL2003/000969, filed on 16 Nov. 2003 and entitled "SYSTEM FOR SECURING ACCESS TO DATA STREAMS", which was published on 21 Oct. 2004 in the English language with International Publication Number WO 2004/091132, and which relies for priority on Israel Patent Application No. 155416, filed on 13 Apr. 2003.

FIELD OF THE INVENTION

The present invention relates to delivery of digital content, and more particularly to systems for controlling the delivery of digital content based on rules.

BACKGROUND OF THE INVENTION

The IEEE 1394 high-speed serial bus provides enhanced PC connectivity for consumer electronics audio/video (A/V) appliances, storage peripherals, other PCs, and portable devices, making it possible to transfer content quickly and efficiently around such devices. An industry developed standard, DTCP (5C) copy protection scheme (Digital Transmission Content Protection Specification, Vol. 1, available at www.dtcp.com/info_dtcp_v1.pdf), provides content protection against the unauthorized copying and transmission of digital images and sound. DTCP was developed to encrypt digital content as it moves over an IEEE 1394 interface from pay television systems like cable and satellite. The DTCP scheme supports capabilities such as moving copies from personal video recorders to removable digital tape or disc recordings, and transferring copies among servers located in different places in a home. DTCP technology includes three basic copy control states, designated Copy Freely, Copy One Generation, and Copy Never, any of which can be applied to particular items of content. The DTCP system thus enables generations of control information, where the copy control state of data in a particular location directly affects the next generation copy control state, dependant on the particular copy control in use for the first generation.

In general, pay television systems, as well as MPEG (ISO/IEC JTC1/SC29/WG11)/DVD have been designed to protect content, while controlling the transport stream and delivering clear uncompressed content for display. (DVD specifications are available on the Internet at ecma.ch. Specific specifications include ECMA-267 (97) 120 mm DVD-Read-Only Disk; ECMA-268 (97) 80 mm DVD-Read-Only Disk; and ECMA-272 (99) 120 DVD Rewriteable Disk (DVD-RAM) also published as ISO-IEC 16824).

Digital data is particularly valuable in its clear compressed format, as clear compressed digital data can easily be transmitted because of its size. Additionally, every copy of clear compressed digital data is identical. End to end content protection has shown the importance of maintaining the data encrypted until it is being used; see, for example, the discussion in NDS marketing white paper XTV Persistent End-to-End Content Protection (30 Jul. 2002 publication number XT-M164).

When encrypted video has been decrypted, it still cannot be used until it has been decompressed and decoded. However, other data types are used in the format derived by decryption, with no further processing. For example, related but not limited to television programming, interactive data and metadata (for example program titles) typically require no further processing after decryption. As a result, by "pretending" that video data is not video, it may be possible to fool a system into delivering video in clear compressed format. The video data can then be disseminated rapidly, bypassing all content protection and conditional access schemes.

Throughout the present specification, various encryption algorithms are referred to. Information on the encryption algorithms referred to can be found in Bruce Schneier, *Applied Cryptography* second edition, 1996, John Wiley and Sons; and in Alfred J. Menezes, Paul C. van Oorschot, and Scott A. Vanstone, *A Handbook of Applied Cryptography* 1997, CRC Press.

The disclosures of all references mentioned above and throughout the present specification are hereby incorporated herein by reference.

SUMMARY OF THE INVENTION

Given the shortcomings of the prior art as described above, it is desirable to provide a mechanism that controls whether scrambled compressed content can be used: in clear compressed format; or only after decoding.

The present invention, in preferred embodiments thereof, seeks to provide an improved mechanism whereby additional security features are added to a video processor. Preferably, the additional security features include headend control which explicitly determines whether the content can be output clear compressed or not. The headend control is enforced in preferred embodiments of the present invention by providing content which is protected by additional encryption and by utilizing an additional decryption element that is only accessible when preparing clear uncompressed content.

The term "headend" is used throughout the present specification and claims to include any hardware and software used to prepare digital data for distribution; such preparation typically includes encrypting, compressing and multiplexing the digital data.

The term "data" is used throughout the present specification and claims to include one or more of the following: video; audio; teletext; interactive applications; and metadata. Metadata typically includes one or more of the following: program specific information; service information; electronic program guide information; or any other metadata which might be included in a broadcast stream.

The term "clear" is used throughout the present specification to refer to a state of data which is neither scrambled nor encrypted. For example, and without limiting the generality of the foregoing, the term "clear compressed data" refers to compressed data which is neither scrambled nor encrypted.

The term "render" is used, in all of its grammatical forms, throughout the present specification and claims to refer to any appropriate mechanism or method of making content palpable to one or more of the senses. In particular and without limiting the generality of the foregoing, "render" refers not only to display of video content but also to playback of audio content.

The term "null compression" is used throughout the present specification and claims to mean not compressed.

There is thus provided in accordance with a preferred embodiment of the present invention a method for protecting digital content including receiving compressed encrypted digital content, determining an output format based, at least in part, on all of the following a user-requested output format, received control information, and a rule determining whether a clear compressed output format is allowed, and producing output from the compressed digital content based on a result of the determining, wherein, if the rule does not allow clear compressed output format, the compressed encrypted digital content is provided in a form which prevents production of clear compressed output in the producing step.

Further in accordance with a preferred embodiment of the present invention the form which prevents production of clear compressed output includes compressed encrypted digital content, additionally encrypted in accordance with a second encryption method, and the producing includes decrypting in accordance with the second encryption method, and decompressing, and the producing includes an atomic operation.

Still further in accordance with a preferred embodiment of the present invention the method includes providing an output-producing hardware device, wherein at least the producing is performed in the hardware device.

Additionally in accordance with a preferred embodiment of the present invention the hardware device is characterized by a device profile, and the determining is also based, at least in part, on the device profile.

Moreover in accordance with a preferred embodiment of the present invention the determining is also performed in the hardware device.

Further in accordance with a preferred embodiment of the present invention the hardware device is included in a single integrated circuit.

Still further in accordance with a preferred embodiment of the present invention the integrated circuit is included in a smart card.

Additionally in accordance with a preferred embodiment of the present invention the method includes rendering the output sensible to at least one human sense.

Moreover in accordance with a preferred embodiment of the present invention the rendering includes at least one of the following: audio rendering; visual rendering; and audio/visual rendering.

Further in accordance with a preferred embodiment of the present invention the compression includes null compression.

Still further in accordance with a preferred embodiment of the present invention local scrambling is applied to the content.

Additionally in accordance with a preferred embodiment of the present invention no output is produced.

There is also provided in accordance with another preferred embodiment of the present invention apparatus for protecting digital content including a digital content receiver receiving compressed encrypted digital content, an output format determination unit determining an output format based, at least in part, on all of the following: a user-requested output format; received control information; and a rule determining whether a clear compressed output format is allowed, and a content output unit producing output from the compressed digital content based on a result produced by the output format determination unit, wherein, if the rule does not allow clear compressed output format, the compressed encrypted digital content is provided to the digital content receiver in a form which prevents production of clear compressed output by the content output unit.

Further in accordance with a preferred embodiment of the present invention the form which prevents production of clear compressed output includes compressed encrypted digital content, additionally encrypted in accordance with a second encryption method, and the content output unit includes a decrypting unit decrypting in accordance with the second encryption method, and decompressing apparatus, and the content output unit produces output in an atomic operation.

Still further in accordance with a preferred embodiment of the present invention the apparatus includes an output-producing hardware device, wherein at least the content output unit is included in the hardware device.

Additionally in accordance with a preferred embodiment of the present invention the hardware device is characterized by a device profile, and the output format determination unit determines the output format based, at least in part, on the device profile.

Moreover in accordance with a preferred embodiment of the present invention the output format determination unit is also included in the hardware device.

Further in accordance with a preferred embodiment of the present invention the hardware device is included in a single integrated circuit.

Still further in accordance with a preferred embodiment of the present invention the integrated circuit is included in a smart card.

Additionally in accordance with a preferred embodiment of the present invention the apparatus includes a rendering device which renders the output sensible to at least one human sense.

Moreover in accordance with a preferred embodiment of the present invention the rendering device includes at least one of the following: an audio rendering device; a visual rendering device; and an audio/visual rendering device.

Further in accordance with a preferred embodiment of the present invention the compression includes null compression.

Still further in accordance with a preferred embodiment of the present invention local compression is applied to the content.

Additionally in accordance with a preferred embodiment of the present invention no output is produced.

There is also provided in accordance with yet another preferred embodiment of the present invention a digital content receiver (DCR) including: a local scrambling descrambler; a broadcast descrambler receiving an output produced by the local scrambling descrambler; a local scrambler, a combined extra encryption algorithm decryptor and decoder/decompressor (XDDC), and a switch operative to provide an output of the broadcast descrambler to exactly one of the local scrambler and the XDDC, wherein the DCR is operative to receive control information and compressed encrypted digital content, and at least the setting of the switch is determined, at least in part, by the control information, and the DCR is operative to produce an output based on all of the following: the compressed digital content; a user-requested output format; the received control information; and a rule determining whether a clear compressed output format is allowed, and if the rule does not allow clear compressed output format, the compressed encrypted digital content is provided to the DCR in a form which prevents production of clear compressed output as the output of the DCR.

Further in accordance with a preferred embodiment of the present invention the local scrambling descrambler is operative to perform exactly one of the following operations based, at least in part, on the received control information: receive an input and produce an output substantially identical to the received input; and receive an input, and perform descrambling on the received input, thereby producing an output.

Still further in accordance with a preferred embodiment of the present invention the local scrambler is operative to perform exactly one of the following operations based, at least in part, on the received control information receive an input and produce an output substantially identical to the received input, and receive an input and perform local scrambling on the received input, thereby producing an output.

Additionally in accordance with a preferred embodiment of the present invention the DCR includes an output-producing hardware device, wherein at least the content output unit is included in the hardware device.

Moreover in accordance with a preferred embodiment of the present invention the hardware device is included in a single integrated circuit.

Further in accordance with a preferred embodiment of the present invention the integrated circuit is included in a smart card.

Still further in accordance with a preferred embodiment of the present invention the DCR includes a rendering device which renders the output sensible to at least one human sense.

Additionally in accordance with a preferred embodiment of the present invention the rendering device includes at least one of the following an audio rendering device, a visual rendering device, and an audio/visual rendering device.

Moreover in accordance with a preferred embodiment of the present invention the XDDC is operative, based, at least in part, on the received control information, to receive an input, and descramble and decode the received input in an atomic operation, thereby producing an output.

There is also provided in accordance with yet another preferred embodiment of the present invention a content-protected personal video recorder (PVR) including a DCR, and a PVR unit including PVR storage media, the PVR unit receiving the output produced by the DCR.

Further in accordance with a preferred embodiment of the present invention the PVR unit is operative to store the received output on the PVR storage media.

Still further in accordance with a preferred embodiment of the present invention the output produced by the DCR includes locally scrambled output.

Additionally in accordance with a preferred embodiment of the present invention the PVR unit is operative to retrieve the stored output from the PVR storage media.

Moreover in accordance with a preferred embodiment of the present invention the output retrieved by the PVR includes locally scrambled output.

Further in accordance with a preferred embodiment of the present invention the DCR performs at least one of the following on the locally scrambled output retrieved by the PVR decryption, and decompression.

Still further in accordance with a preferred embodiment of the present invention the PVR unit is operative to store received XEA encrypted output on the PVR storage media.

Additionally in accordance with a preferred embodiment of the present invention the output produced by the DCR includes XEA encrypted output.

Moreover in accordance with a preferred embodiment of the present invention the PVR unit is operative to retrieve the stored XEA encrypted output from the PVR storage media.

Further in accordance with a preferred embodiment of the present invention the output retrieved by the PVR includes XEA encrypted output.

Still further in accordance with a preferred embodiment of the present invention the DCR performs, as an atomic operation, decryption and decompression on the XEA encrypted output retrieved by the PVR.

There is also provided in accordance with yet another preferred embodiment of the present invention a content-protected television system including a DCR, and a television unit, the television unit receiving the output produced by the DCR.

Further in accordance with a preferred embodiment of the present invention the television unit includes an analog television unit.

Still further in accordance with a preferred embodiment of the present invention the television unit includes a digital television unit.

BRIEF DESCRIPTION OF THE DRAWINGS

The present invention will be understood and appreciated more fully from the following detailed description, taken in conjunction with the drawings in which:

FIG. 2A is a generalized block diagram illustration of a system for producing scrambled compressed digital content, useful for understanding the operation of the system of FIG. 1;

FIG. 2B is a generalized block diagram illustration of an alternative system for producing scrambled compressed digital content, useful for understanding the operation of the system of FIG. 1;

FIG. 3 is a generalized block diagram illustration of a preferred implementation of the system of FIG. 1, illustrating an implementation in which output is stored in a PVR;

FIG. 4 is a generalized block diagram illustration of an alternative preferred implementation of the system of FIG. 1, illustrating an implementation in which output comprises compressed content;

DETAILED DESCRIPTION OF A PREFERRED EMBODIMENT

Figure 1:
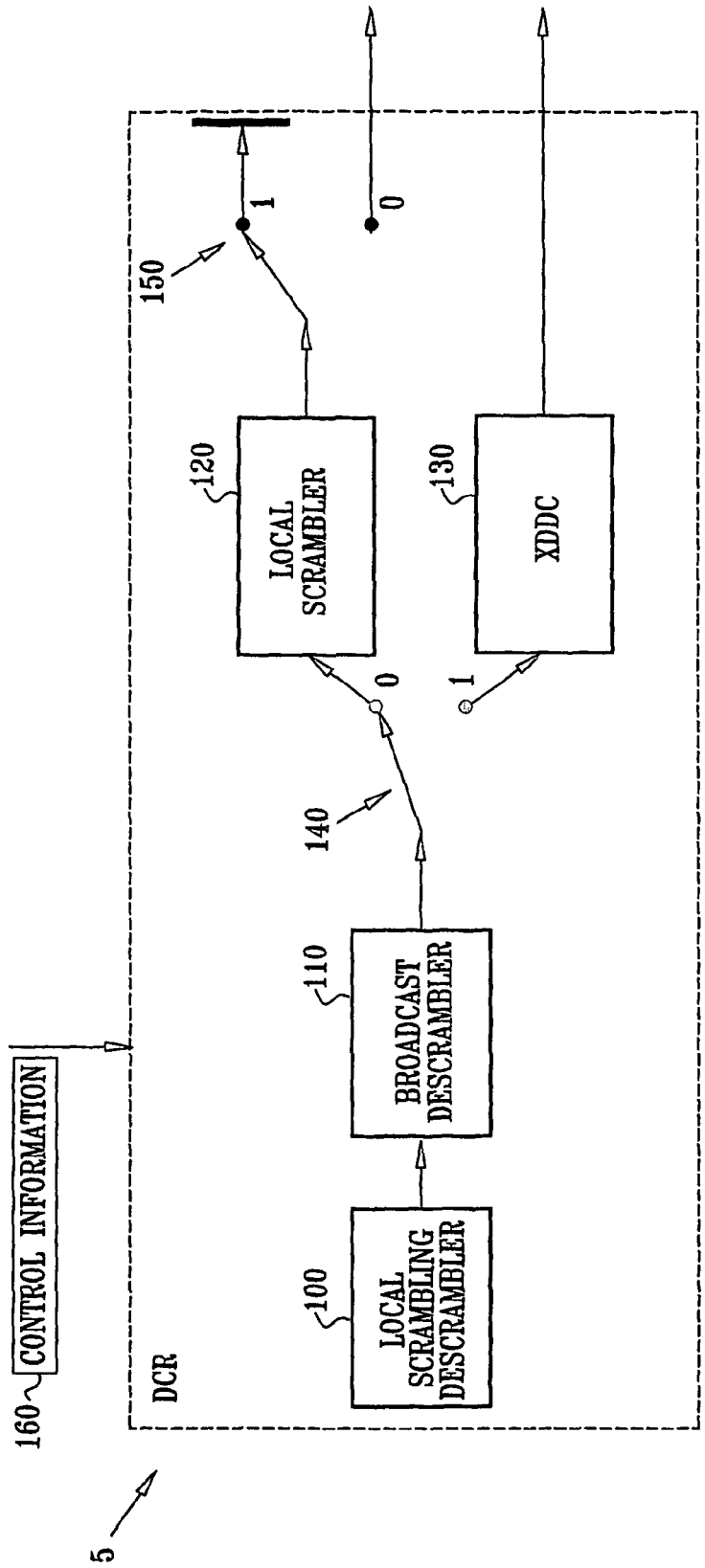
FIG. 1 is a generalized block diagram illustration of a clear compressed content control system constructed and operative in accordance with a preferred embodiment of the present invention.

Reference is now made to FIG. 1, which is a generalized block diagram illustration of a clear compressed content control system constructed and operative in accordance with a preferred embodiment of the present invention.

The system of FIG. 1 comprises a digital content receiver (DCR) 5. The DCR 5 is preferably operative to receive scrambled compressed digital content and to produce therefrom one or more types of output in accordance with content control rules, as will be described in more detail below. Persons skilled in the art will appreciate that the DCR 5 may comprise a single integrated circuit. Persons skilled in the art will further appreciate that the circuit described in this specification need not be embedded in fixed hardware; rather, all or part of the circuit described may be embedded in a removable security element, such as a smart card.

Reference is now additionally made to FIG. 2A, which is a generalized block diagram illustration of a system for producing scrambled compressed digital content, useful for understanding operation of the system of FIG. 1. The system of FIG. 2A is provided by way of example only and is not meant to be limiting.

In the system illustrated in FIG. 2A, clear content 10, typically comprising clear digital content, is input. A compression device 20 compresses the clear content 10, using any appropriate compression method, such as MPEG-2 or MPEG-4, as is well known in the art, to produce compressed clear digital content 30.

The compressed clear digital content 30 is input to a broadcast scrambler 40, which, using encryption methods known in the art, produces therefrom scrambled compressed digital content 50. Non-limiting examples of such encryption methods include DVB (refer to standard ETSI EN 301 192), DES, and 3DES (both DES and 3DES are described in *Applied Cryptography*, referred to above, at pp. 265-301).

Reference is now additionally made to FIG. 2B, which is a generalized block diagram illustration of an alternative system for producing scrambled compressed digital content, useful for understanding operation of the system of FIG. 1. The system of FIG. 2B is provided by way of example only and is not meant to be limiting.

The system of FIG. 2B is preferably similar to the system of FIG. 2A, and additionally comprises apparatus for implementing an "extra" encryption algorithm (XEA). Nonlimiting examples of encryption schemes usable for XEA, which schemes are well known in the art, preferably include Diffie-Hellman (described in *Applied Cryptography*, referred to above, at pp. 513-516) and El-Gamal (refer to *Applied Cryptography* pgs. 532-533).

In the system illustrated in FIG. 2B, clear content 10, typically comprising clear digital content, is received. A compression device 20 compresses the clear content 10, using any appropriate compression method, as is well known in the art, to produce compressed clear digital content 30.

The compressed clear digital content 30 is received by an XEA scrambler 240, which produces therefrom XEA scrambled compressed digital content 230.

The XEA scrambled compressed digital content 230 is input to the broadcast scrambler 40. The broadcast scrambler 40 produces therefrom broadcast scrambled XEA scrambled compressed digital content 250 using encryption methods similar to those described above with reference to FIG. 2A.

Referring back to FIG. 1, the DCR 5 preferably comprises the following components, each of which is typically implemented in either hardware, software, or a combination thereof:

1. A descrambler, shown in FIG. 1 by way of example only as a local scrambling descrambler 100. It is appreciated that the type of descrambler 100 provided in the system of FIG. 1 is chosen to correspond to a type of scrambling used to scramble content intended for the DCR 5. Examples of local scrambling would include, but not be limited to, such well known algorithms as AES (FIPS-197, described in csrc.nist.gov/publications/fips/fips197/fips-197.pdf), skipjack (FIPS-185, described in csrc.nist.gov/encryption/skipjack/skipjack.pdf), blowfish (described in *Applied Cryptography*, referred to above, at pp. 336-339), RC5 (described in *Applied Cryptography*, referred to above, at pp. 344-346), IDEA (described in *Applied Cryptography*, referred to above, at pp. 319-325), two fish (described on the Internet at www.counterpane.com/twofish.html), DEAL (described on the Internet at www.ii.uib.no/~lasr/newblock.html), RC6 (described on the Internet at theory.lcs.mit.edu/~rivest/rc6.ps), serpent (described on the Internet at www.c1.cam.ac.uk/~rja14/serpent.html), RC4 (described in *Applied Cryptography*, referred to above, at pp. 397-398), and SEAL (described in *Applied Cryptography*, referred to above, at pp. 398-400).

2. A broadcast descrambler 110, which is preferably operatively associated with the local scrambling descrambler 100. The broadcast descrambler 110 is preferably operative to receive the output produced by the local scrambling descrambler 100 and to perform broadcast descrambling thereon.

3. A local scrambler 120, which is preferably operatively associated with the broadcast descrambler 110 via a switch 140. When the switch 140 is set to send output from the broadcast descrambler 110 to the local scrambler 120, the local scrambler 120 is preferably operative to receive said output and to perform local scrambling thereon. It is appreciated that, depending on the information in the control information 160, the local scrambler 120 may alternatively take no scrambling action; in such a case the local scrambler 120 preferably produces output substantially identical to the input received by the local scrambler 120.

4. A combined XEA decryptor and decode/decompressor (XDDC) 130, which is also preferably operatively associated with the broadcast descrambler 110 via the switch 140. When the switch 140 is set to send output from the broadcast descrambler 110 to the XDDC 130, the XDDC 130 is preferably operative to receive said output and to perform both XEA decryption and decoding/decompression thereon.

The attribute of operations being able to be performed only together, and not separately, is referred to in the present specification and claims as an "atomic operation".

For example, decryption and decoding/decompression in the XDDC 130 comprise an atomic operation. The XDDC 130 is designed in such a way that the XDDC 130 must perform decoding and decompressing together. The XDDC 130 will not perform decoding alone, nor will the XDDC perform decompressing alone. Anti-tamper techniques, which are well known in the art, are preferably used to ensure the integrity of the XDDC 130.

The term "XEA", as used throughout the present specification and claims refers to any appropriate encryption scheme. Nonlimiting examples of encryption schemes usable for XEA might preferably include Diffie-Hellman and El-Gamal. The key (also referred to herein as a "control word") for XEA is preferably provided by a conditional access system broadcasting an entitlement control message, as is known in the art. A device (not shown in FIG. 1) such as a set-top box or PVR, in which the DCR 5 may preferably be comprised, receives the entitlement control message. Using techniques known in the art, the device (not shown in FIG. 1) derives the control word from the entitlement control message and provides the control word to the DCR 5.

5. A plurality of switches, shown in FIG. 1 as the first switch 140 and the second switch 150 described above. As will be described in more detail below, the plurality of switches preferably also includes other switches (not shown in FIG. 1). Each of the plurality of switches is preferably set in accordance with control information 160 received by the DCR 5. The control information 160 is preferably determined, at least in part, by an owner or controller (not shown) of digital content (not shown in FIG. 1) sent to the DCR 5. In some preferred embodiments of the present invention, the control information 160 is also preferably determined, at least in part, based on input of a user of the DCR 5, requesting to make use of the digital content in a particular way. In some preferred embodiments of the present invention, the control information 160 is also preferably determined, at least in part, based on receiver policy. The control information 160 and the manner in which the plurality of switches are preferably set are described in more detail below.

It is appreciated that, depending on the information contained in the control information 160 and the scrambling state of the content, each of the local scrambling descrambler 100; the broadcast descrambler 110; the local scrambler 120; and the XDDC 130 in the system of FIG. 1 may be either preferably operational or non-operational. For example, and without limiting the generality of the foregoing, the local scrambling descrambler 100 may or may not perform local scrambling descrambling. Another non-limiting example would be that the local scrambler 120 may or may not perform local scrambling. It is appreciated that if any one or more of the local scrambling descrambler 100; the broadcast descrambler 110; the local scrambler 120; and the XDDC 130 are non-operational, data input into the non-operational element would be passed substantially unchanged as the output thereof.

Persons skilled in the art will appreciate that the DCR 5 also preferably comprises other components (not shown), which typically comprise conventional components well known in the art of content receivers. Non-limiting examples of such components include tuners, demultiplexers, and digital-to-analog converters.

The operation of the system of FIG. 1 is now briefly described.

Various modes of operation of the system of FIG. 1 are determined based on the control information 160 received by the DCR 5. Preferably, upon receiving a new item of digital content, the first switch 140 is set to 0 and the second switch 150 is set to 1, preventing any output from being produced by the DCR 5; this is intended to guarantee that output based on any particular item of digital content is controlled only on the basis of control information 160 associated with that item of digital content.

Persons skilled in the art will appreciate, as discussed above, that digital data is particularly valuable in its clear compressed format because a recipient without authorization can easily use clear compressed digital data. Furthermore, digital data in its clear compressed format is easily transmitted. Therefore, it is an object of the present invention, in certain preferred embodiments thereof, to prevent the output of clear compressed content when the control information 160 does not permit such output.

Figure 9:
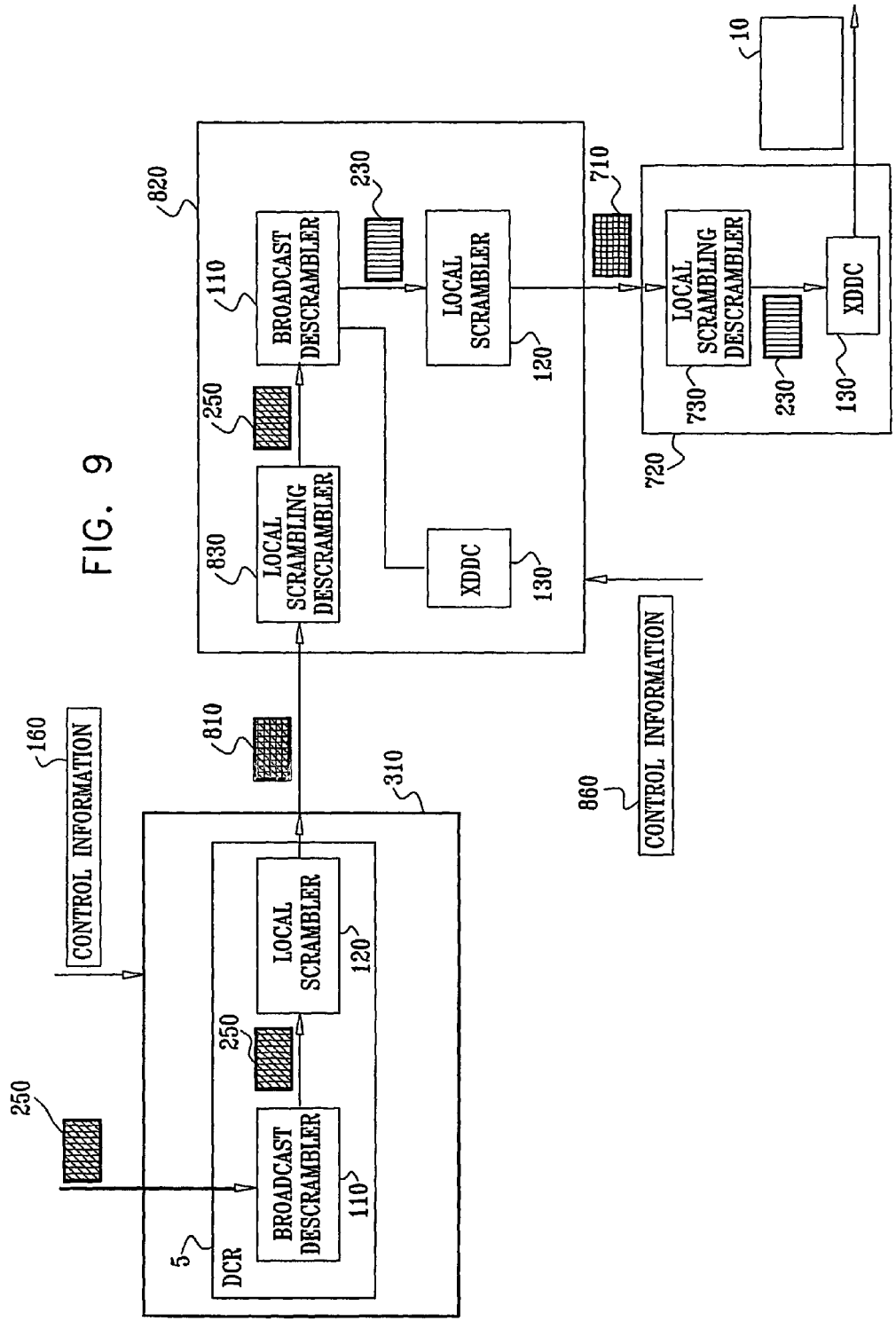
FIG. 9 is a generalized block diagram illustration of still another alternative preferred implementation of the system of FIG. 1, illustrating another implementation in which output is displayed on a digital television.
Figure 10:
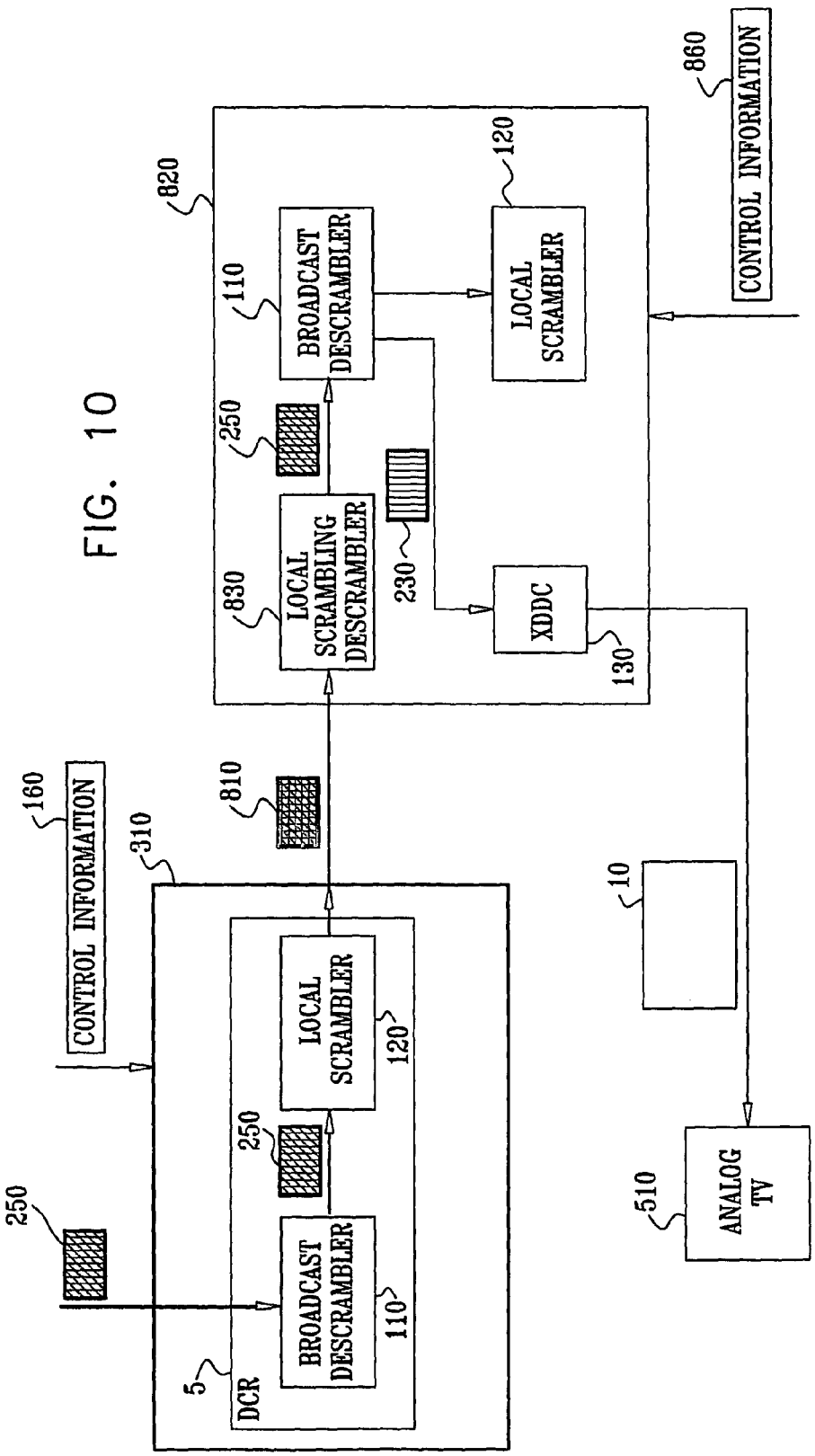
FIG. 10 is a generalized block diagram illustration of another alternative preferred implementation of the system of FIG. 1, illustrating another implementation in which output is displayed on an analog television.

The following discussion, beginning with the description of FIG. 3 and until the end of the description of FIG. 10, relates to various implementations of systems comprising the DCR 5. Detailed description of the DCR 5 resumes with the description of FIG. 11. In FIGS. 3-10 and in the descriptions of FIGS. 3-10, in many cases, for ease of depiction and description, details of the DCR 5 are omitted.

Reference is now made to FIG. 3, which is a generalized block diagram illustration of a preferred implementation of the system of FIG. 1. In the system of FIG. 3, broadcast scrambled, XEA scrambled compressed content 250 is received as input by a device 310, comprising the DCR 5. Non-limiting examples of such the device 310 would be a set-top box (STB) or personal video recorder (PVR). In the implementation of FIG. 3, and based on the control information 160, the broadcast scrambled, XEA scrambled compressed content 250 bypasses the DCR 5 in order to be output as broadcast scrambled, XEA scrambled compressed content 250 to storage media (not shown in FIG. 3) comprised in a PVR 320. Persons skilled in the art will appreciate that the PVR 320 may comprise the same unit or may share components with the DCR 5, and is shown as a separate unit in FIG. 3 for illustrative purposes only.

Reference is now made to FIG. 4, which is a generalized block diagram illustration of an alternative preferred implementation of the system of FIG. 1. In the system of FIG. 4, in accordance with received control information 160, broadcast scrambled content 50 is input into a device 310, comprising the DCR 5. Non-limiting examples of the device 310 would be a STB or PVR. In the implementation of FIG. 4, and based on the control information 160, the broadcast scrambled content 50 is input to the broadcast descrambler 110, producing compressed clear digital content 30. The compressed clear digital content 30 is output from the system. Persons skilled in the art will appreciate that the implementation of FIG. 4 is useful when the broadcast scrambled content 50 comprises interactive television data and does not comprise valuable video content.

Figure 5:
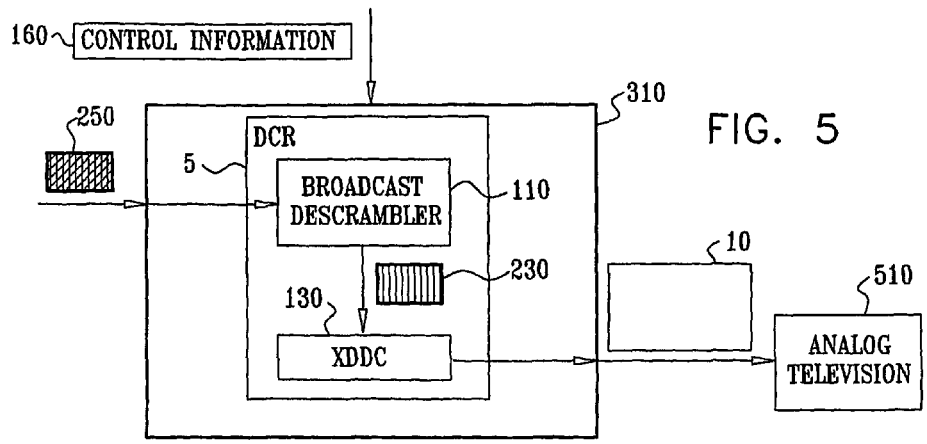
FIG. 5 is a generalized block diagram illustration of another alternative preferred implementation of the system of FIG. 1, illustrating an implementation in which output is displayed on an analog television.

Reference is now made to FIG. 5, which is a generalized block diagram illustration of another alternative preferred implementation of the system of FIG. 1. In the system of FIG. 5, in accordance with received control information 160, broadcast scrambled, XEA scrambled compressed content 250 is input into the device 310, comprising the DCR 5. Non-limiting examples of the device 310 would be a STB or PVR. In the implementation of FIG. 5, and based on the control information 160, the broadcast scrambled content, XEA scrambled compressed content 250 is input to the broadcast descrambler 110, producing XEA scrambled compressed content 230.

The XEA scrambled compressed content 230 is then input into the XDDC 130, which, in an atomic operation, produces clear content 10. The clear content 10 thus produced is input into an analog television 510 for viewing.

Figure 6A:
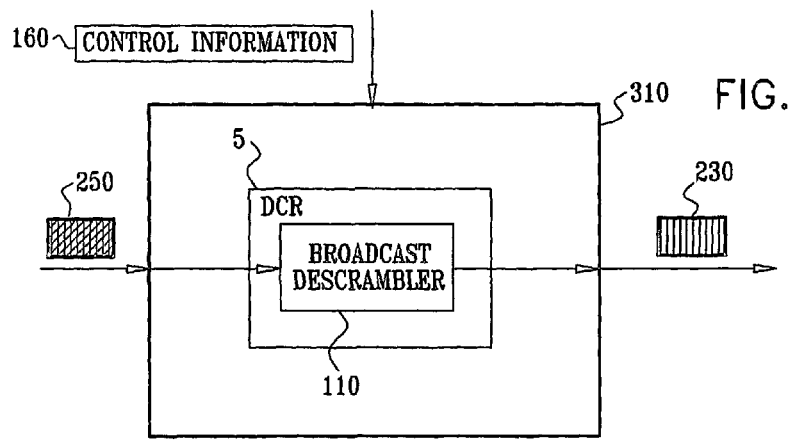
FIG. 6A is a generalized block diagram illustration of yet another alternative preferred implementation of the system of FIG. 1, illustrating an implementation in which output is not useable.
Figure 6B:
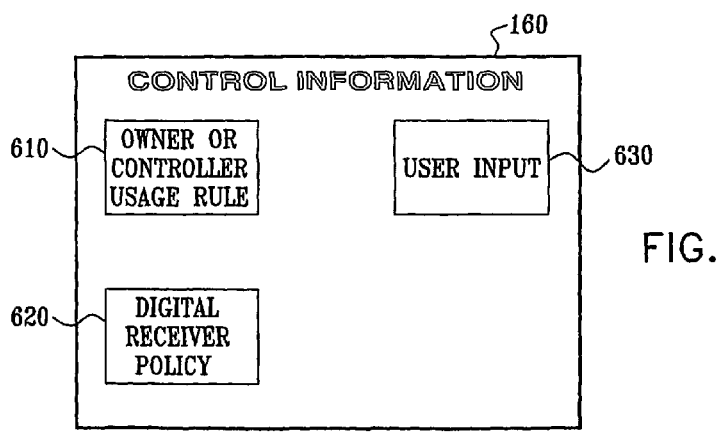
FIG. 6B is a generalized block diagram illustration of a preferred embodiment of control information, useful for understanding FIG. 6A.

Reference is now made to FIG. 6A, which is generalized block diagram illustration of another alternative preferred implementation of the system of FIG. 1. In the system of FIG. 6A, in accordance with received control information 160, broadcast scrambled, XEA scrambled compressed content 250 is input into the device 310 preferably comprising the DCR 5. Non-limiting examples of the device 310 would be a STB or PVR. Reference is now additionally made to FIG. 6B which is a generalized illustration of several elements which are preferably comprised in control information 160, useful for understanding FIG. 6A. Control information 160 preferably comprises: an owner or controller usage rule 610; a digital receiver policy 620; and user input 630.

In the implementation of FIG. 6A, at least one element of the owner or controller usage rule 610, and/or the digital receiver policy 620 prohibit decryption. In the implementation of FIG. 6A, the user attempts to use user input 630 of the control information 160 in order to override the decryption prohibition resulting from the combination of owner or controller usage rule 610 and the digital receiver policy 620.

In the implementation of FIG. 6A, and based on the control information 160, the broadcast scrambled content 250 is input to the broadcast descrambler 110, producing XEA scrambled compressed content 230. In the absence of any further control information, the XEA scrambled compressed content 230 output is not decrypted.

Lacking decryption, and in the absence of another means of performing XEA decryption, the XEA scrambled compressed content 230 output is rendered effectively useless.

Figure 7:
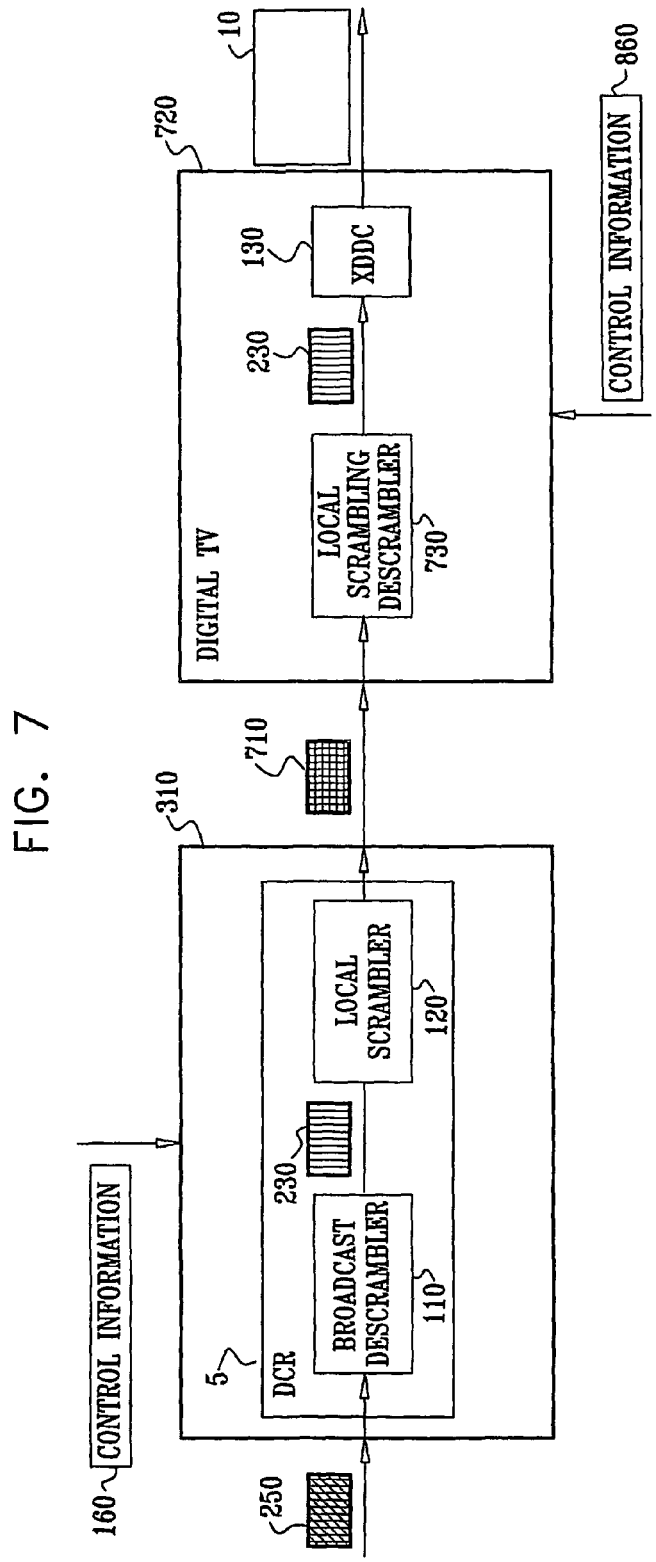
FIG. 7 is a generalized block diagram illustration of another alternative preferred implementation of the system of FIG. 1, illustrating an implementation in which output is displayed on a digital television.

Reference is now made to FIG. 7, which is a generalized block diagram illustration of another alternative preferred implementation of the system of FIG. 1. In the system of FIG. 7, in accordance with received control information 160, broadcast scrambled, XEA scrambled compressed content 250 is input into the device 310 comprising the DCR 5. Non-limiting examples of the device 310 would be a STB or PVR. In the implementation of FIG. 7, and based on the control information 160, the broadcast scrambled, XEA scrambled compressed content 250 is input to the broadcast descrambler 110, producing XEA scrambled compressed content 230.

The XEA scrambled compressed content 230 is input into the local scrambler 120 which outputs local scrambled, XEA scrambled compressed content 710. The local scrambled, XEA scrambled compressed content 710 is output by the device 310 and input into a digital television 720.

Within the digital television 720, in accordance with second generation control information 860, the local scrambled, XEA scrambled compressed content 710 is input into the local scrambling descrambler 730, producing XEA scrambled compressed content 230. The XEA scrambled compressed content 230 is input into the XDDC 130, which in an atomic operation produces clear content 10, suitable for viewing.

With reference to the second generation control information 860, it is appreciated that in all cases where there is control information 160 and second generation control information 860, the original control information 160 is preferably reflected in the second generation control information 860. Non-limiting examples of first generation control information 160 being reflected in second generation control information 860 would be, as discussed above, the DTCP specification basic copy states. A specific non-limiting example of the operation of first and second generation control information would be where first generation control information 160 allows copy once; in such a case, the second generation control information 860 for the copy would allow no further copying. Another specific non-limiting example would be where the first generation control information 160 allows copy freely; the second generation control information 860 would also allow copy freely.

Figure 8:
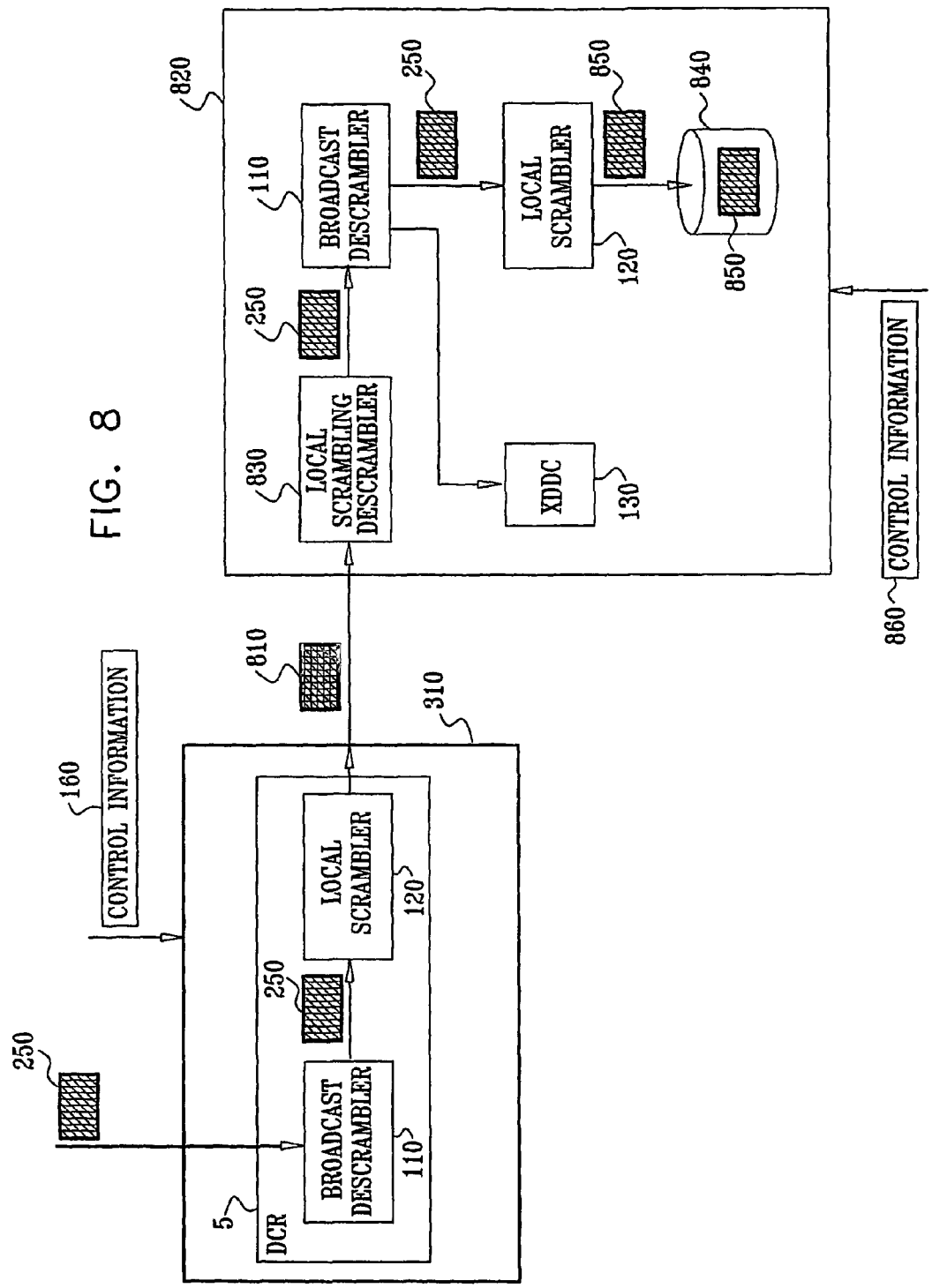
FIG. 8 is a generalized block diagram illustration of yet another alternative preferred implementation of the system of FIG. 1, illustrating another implementation in which output is stored in a PVR.

Reference is now made to FIG. 8, which is a generalized block diagram illustration of another alternative preferred implementation of the system of FIG. 1. In the system of FIG. 8, in accordance with received control information 160, broadcast scrambled, XEA scrambled compressed content 250 is input into the device 310 comprising a DCR 5. A non-limiting example of the device 310 would be a STB or PVR. In the implementation of FIG. 8, and based on the control information 160, the broadcast scrambled, XEA scrambled compressed content 250 is input to the broadcast descrambler 110.

In accordance with the control information 160, the broadcast descrambler 110 takes no action. It is appreciated that the broadcast scrambler 110 preferably comprises an internal switch (not shown), which, based on the control information 160, is set to take no action. The broadcast scrambled, XEA scrambled compressed content 250 is input to the local scrambler 120. The local scrambler 120 outputs locally scrambled broadcast scrambled XEA scrambled compressed content 810. The locally scrambled broadcast scrambled XEA scrambled compressed content 810 is then output to a PVR 820. Persons skilled in the art will appreciate that the PVR 820 may comprise the same unit or may share components with the device 310, and is shown as a separate unit in FIG. 8 for illustrative purposes only. Should the PVR 820 comprise the same unit as the device 310, it is appreciated that the locally scrambled, broadcast scrambled, XEA scrambled compressed content 810 would preferably comprise locally scrambled, broadcast scrambled, XEA scrambled compressed content 850.

The locally scrambled, broadcast scrambled, XEA scrambled compressed content 810 is then input into a local scrambling descrambler 830, producing broadcast scrambled, XEA scrambled compressed content 250. The broadcast scrambled, XEA scrambled compressed content 250 is input into a broadcast descrambler 110.

In accordance with the second generation control information 860, the broadcast descrambler 110 takes no action, and the broadcast scrambled, XEA scrambled compressed content 250 is input to the local scrambler 120. Persons skilled in the art will appreciate that the second generation control information 860 preferably differs from the control information 160, as explained above in reference to FIG. 7. The local scrambler 120 outputs locally scrambled, broadcast scrambled, XEA scrambled compressed content 850. The locally scrambled, broadcast scrambled, XEA scrambled compressed content 850 is then stored on a PVR storage disk 840. The locally scrambled, broadcast scrambled, XEA scrambled compressed content 850 preferably differs from the locally scrambled, broadcast scrambled, MA scrambled compressed content 810 in that a different control word is preferably used in local scrambling.

With reference to the second generation control information 860, it is appreciated that in all cases where there is control information 160 and a second generation of control information 860, the original control information 160 is preferably reflected in the second generation of control information 860, as described above more fully with reference to FIG. 7.

Reference is now made to FIG. 9, which is a generalized block diagram illustration of another alternative preferred implementation of the system of FIG. 1. In the system of FIG. 9, in accordance with received control information 160, broadcast scrambled, XEA scrambled compressed content 250 is input into the device 310 comprising a DCR 5. A non-limiting example of the device 310 would be a STB or PVR. In the implementation of FIG. 9, and based on the control information 160, the broadcast scrambled, XEA scrambled compressed content 250 is input to the broadcast descrambler 110.

In accordance with the control information 160, the broadcast descrambler 110 takes no action, and the broadcast scrambled, XEA scrambled compressed content 250 is input to the local scrambler 120. The local scrambler 120 outputs locally scrambled, broadcast scrambled, XEA scrambled compressed content 810. The locally scrambled, broadcast scrambled, XEA scrambled compressed content 810 is then output to a PVR 820. Persons skilled in the art will appreciate that the PVR 820 may be comprised in the device 310, or may reside externally thereto, as illustrated in FIG. 9. Should the PVR 820 comprise the same unit as the STB or PVR 310, it is appreciated that the broadcast scrambled, XEA scrambled compressed content 250 is input into the broadcast descrambler 110, producing XEA scrambled, compressed encrypted content 230. The XEA scrambled, compressed encrypted content 230 is then input directly into the local scrambler 120, producing locally scrambled, XEA scrambled compressed content 710, as described below.

In accordance with second generation control information 860, the locally scrambled, broadcast scrambled, XEA scrambled compressed content 810 is then input into a local scrambling descrambler 830, producing broadcast scrambled, XEA scrambled compressed content 250. The broadcast scrambled, XEA scrambled compressed content 250 is input into a broadcast descrambler 110.

With reference to the second generation control information 860, it is appreciated that in all cases where there is control information 160 and a second generation of control information 860, the original control information 160 is preferably reflected in the second generation of control information 860, as described above more fully with reference to FIG. 7.

The broadcast descrambler 110 outputs XEA scrambled compressed content 230, which is input into a local scrambler 120. The local scrambler 120 produces locally scrambled, XEA scrambled compressed content 710 which is input into a digital television 720.

Within the digital television 720 the locally scrambled, XEA scrambled compressed content 710 is input into a local scrambling descrambler 730, producing XEA compressed content 230. The XEA compressed content 230 is input into the XDDC 130, which performs an atomic operation producing clear content 10 suitable for viewing.

Reference is now made to FIG. 10, which is a generalized block diagram illustration of another alternative preferred implementation of the system of FIG. 1. In the system of FIG. 10, in accordance with received control information 160, broadcast scrambled, XEA scrambled compressed content 250 is input into a device 310, comprising the DCR 5. Non-limiting examples of the device 310 would be a STB or PVR. In the implementation of FIG. 10, and based on the control information 160, the broadcast scrambled, XEA scrambled compressed content 250 is input to the broadcast descrambler 110.

In accordance with the control information 160, the broadcast descrambler 110 takes no action, and the broadcast scrambled, XEA scrambled compressed content 250 is input to the local scrambler 120. The local scrambler 120 outputs locally scrambled, broadcast scrambled, XEA scrambled compressed content 810. The locally scrambled, broadcast scrambled, XEA scrambled compressed content 810 is then output to a PVR 820. Persons skilled in the art will appreciate that the PVR 820 may comprise the same unit or may share components with the device 310, and is shown as a separate unit in FIG. 10 for illustrative purposes only.

In accordance with second generation control information 860, the locally scrambled, broadcast scrambled, XEA scrambled compressed content 810 is then input into an local scrambling descrambler 830, producing broadcast scrambled, XEA scrambled compressed content 250. The broadcast scrambled, XEA scrambled compressed content 250 is input into a broadcast descrambler 110.

With reference to the second generation control information 860, it is appreciated that in all cases where there is control information 160 and a second generation of control information 860, the original control information 160 is preferably reflected in the second generation of control information 860, as described above more fully with reference to FIG. 7.

The broadcast descrambler 110 outputs XEA scrambled compressed content 230 which is input into the XDDC 130. The XDDC 130 performs an atomic operation outputting clear content 10, suitable for viewing on an analog television 510.

Referring back to FIG. 1, one skilled in the art will appreciate that the preferred modes of operation of the system of FIG. 1 comprise the following modes:

A. Permitted Modes

The term "permitted modes", as used herein, refers to modes of operation of the system of FIG. 1, which are permitted by the owner or controller of the item of digital content received by the DCR 5.

I. Compressed encrypted content is to be output.
  II. Clear uncompressed content is to be output.
  III. Clear compressed content is to be output.

B. Default Mode, In the Absence of Any Control Information

IV. No output is to be produced.

C. Forbidden Mode

V. Clear compressed content is attempted to be output, not in accordance with the control information 160.

Preferred modes of operation of the system of FIG. 1, in accordance with each of modes I-V, are now described in greater detail.

I. Compressed encrypted content is to be output.

Figure 11:
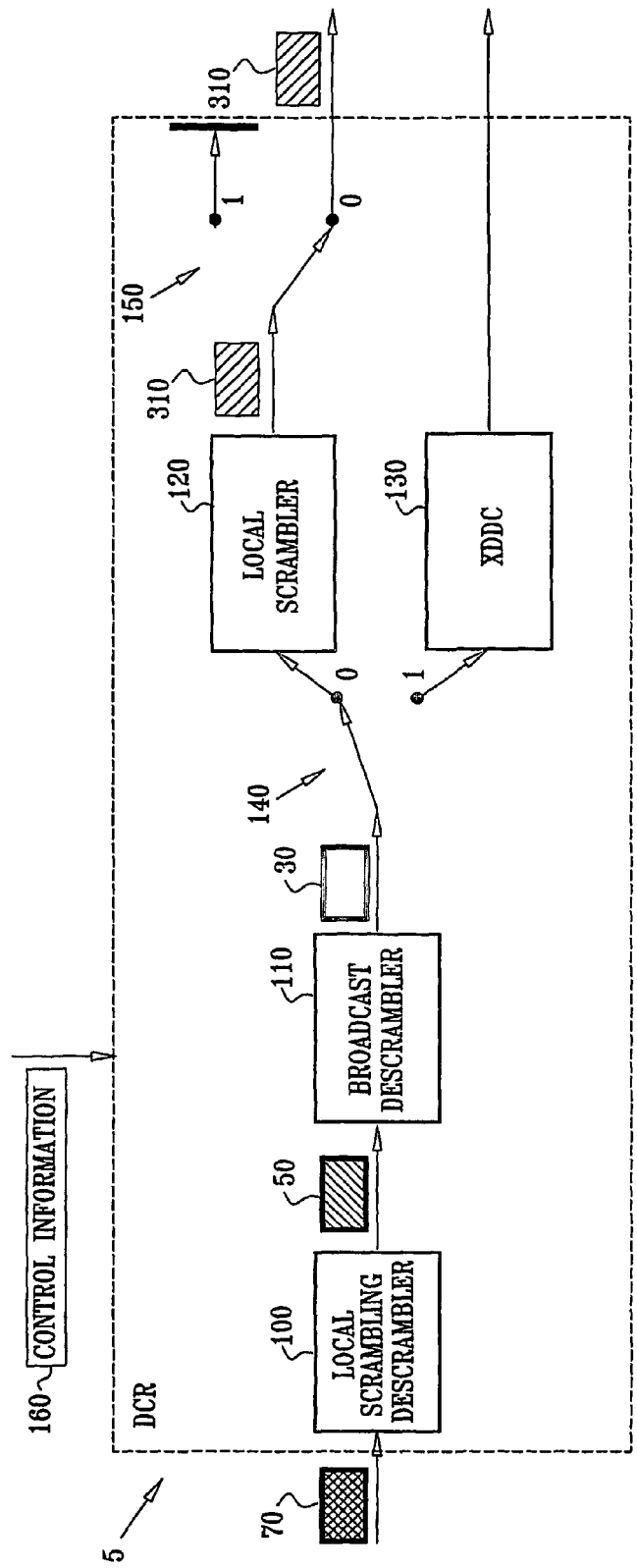
FIG. 11 is a generalized block diagram illustration of a mode of operation of the system of FIG. 1, illustrating a mode in which compressed encrypted content is output.

Reference is now additionally made to FIG. 11, which is a generalized block diagram illustration of the system of FIG. 1, illustrating a mode in which compressed encrypted content is output.

In the mode of operation shown in FIG. 11, locally scrambled, broadcast scrambled, compressed content 70 is input to the DCR 5. The broadcast scrambled, compressed content 70 is descrambled by the local scrambler descrambler 100 producing broadcast scrambled, compressed content 50.

The broadcast scrambled, compressed content 50 is descrambled by the broadcast descrambler 110, producing compressed clear digital content 30.

The first switch 140 is set in accordance with the control information 160 received by the DCR 5 to output compressed clear digital content 30 to the local scrambler 120. The local scrambler 120 scrambles the compressed clear digital content 30, producing compressed locally scrambled output 310.

The second switch 150 is set in accordance with control information 160 received by the DCR 5 to allow output of the compressed locally scrambled output 310.

It is appreciated that there exist in the mode of operation shown in FIG. 11 possible alternative inputs to the DCR 5. Inputs not depicted include: locally scrambled compressed content and broadcast scrambled compressed content. In the cases of locally scrambled compressed content and broadcast scrambled compressed content, in accordance with the control information 160, similarly to the case where locally scrambled, broadcast scrambled, compressed content 70 is input, the mode of operation shown in FIG. 11 produces compressed locally scrambled output 310.

II. Clear uncompressed content is to be output.

Figure 12:
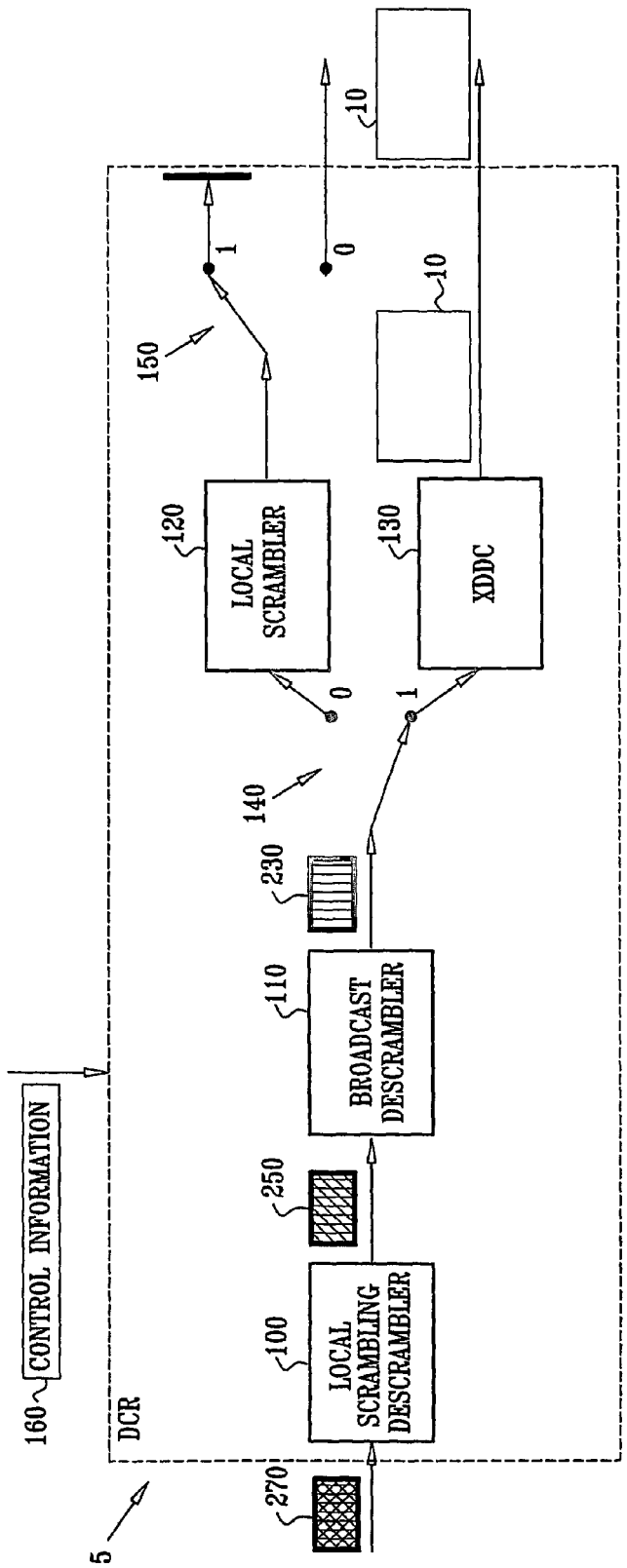
FIG. 12 is a generalized block diagram illustration of an alternative mode of operation of the system of FIG. 1, illustrating a mode in which clear uncompressed content is output.

Reference is now additionally made to FIG. 12, which is a generalized block diagram illustration of the system of FIG. 1, illustrating a mode in which clear uncompressed content is to be output.

In the mode of operation in FIG. 12, locally scrambled, broadcast scrambled, XEA scrambled compressed content 270 is input to the DCR 5. The locally scrambled, broadcast scrambled, XEA scrambled compressed content 270 is descrambled by the local scrambling descrambler 100 producing broadcast scrambled, XEA scrambled compressed content 250.

The broadcast scrambled, XEA scrambled compressed content 250 is descrambled by the broadcast descrambler 110, producing XEA scrambled compressed content 230.

The first switch 140 is set in accordance with control information 160 received by the DCR 5 to output the XEA scrambled compressed content 230 to the XDDC 130.

The XEA scrambled compressed content 230 is XEA decrypted and decompressed by the XDDC 130, which performs an atomic operation producing uncompressed clear content 10.

The second switch 150 is not relevant to the operation of producing uncompressed clear content 10; therefore, the setting of the second switch 150 is preferably not changed from the default position thereof.

It is appreciated that there exist in the mode of operation shown in FIG. 12 possible alternative inputs to the DCR 5. Inputs not depicted include: locally scrambled XEA scrambled compressed content and broadcast scrambled XEA scrambled compressed content. In the cases of locally scrambled XEA scrambled compressed content and broadcast scrambled XEA scrambled compressed content, in accordance with the control information 160, similarly to the case where locally scrambled, broadcast scrambled, XEA scrambled compressed content 270 is input, the mode of operation shown in FIG. 12 produces uncompressed clear content 10.

III. Clear compressed content is to be output.

Figure 13:
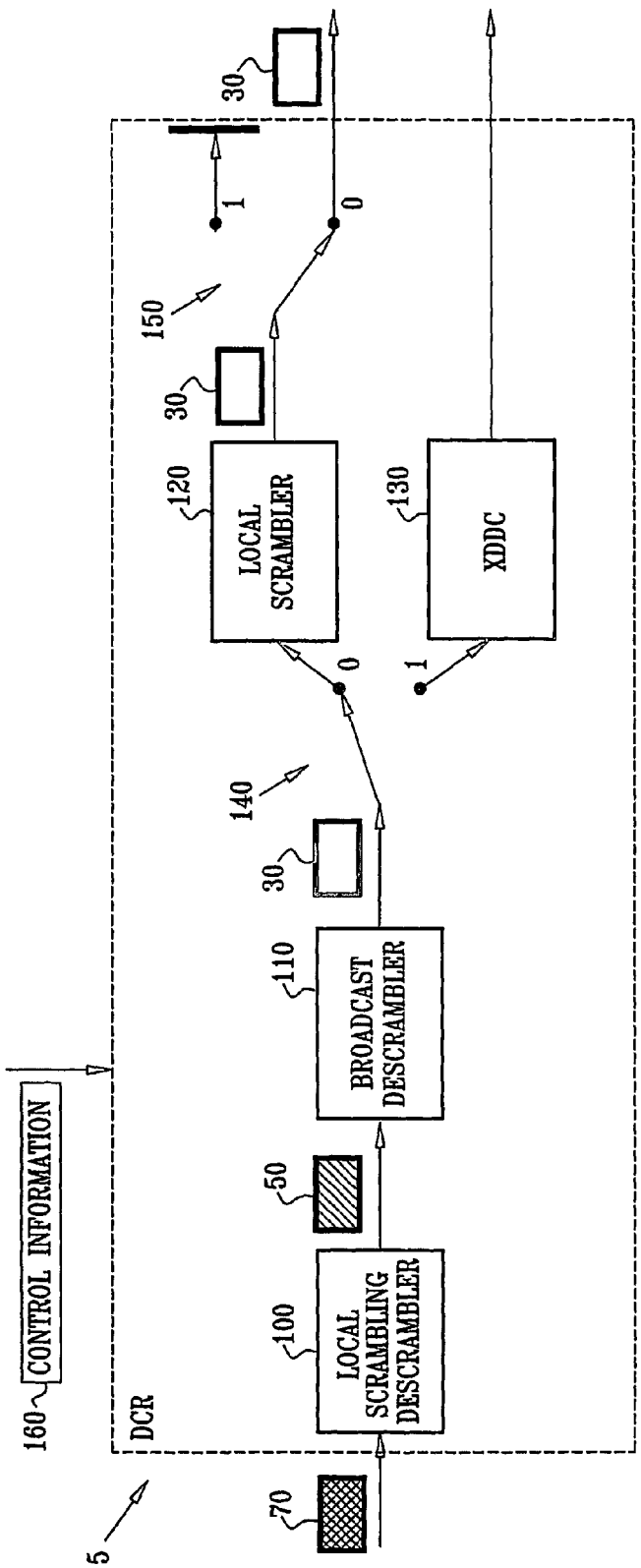
FIG. 13 is a generalized block diagram illustration of an alternative mode of operation of the system of FIG. 1, illustrating a mode in which clear compressed content is output.

Reference is now additionally made to FIG. 13, which is a generalized block diagram illustration of the system of FIG. 1, illustrating a mode in which clear compressed content is to be output.

In the mode of operation in FIG. 13, locally scrambled, broadcast scrambled, compressed content 70 is input to the DCR 5. The locally scrambled, broadcast scrambled, compressed content 70 is descrambled by the local scrambling descrambler 100 producing broadcast scrambled, compressed content 50.

The broadcast scrambled, compressed content 50 is descrambled by the broadcast descrambler 110, producing compressed clear digital content 30.

The first switch 140 is set in accordance with control information 160 received by the DCR 5 to output compressed clear digital content 30 to the local scrambler 120. In accordance with control information 160 received by the DCR 5 and intended for the local scrambler 120, the local scrambler 120 does not scramble the compressed clear digital content 30; the local scrambler 120 preferably passes the received input as its output with no change. It is appreciated that the local scrambler 120 preferably comprises an internal switch (not shown), which in the present implementation is set to take no action.

The second switch 150 is set in accordance with control information 160 received by the DCR 5 to allow output of the compressed clear digital content 30.

It is appreciated that there exist in the mode of operation shown in FIG. 13 possible alternative inputs to the DCR 5. Inputs not depicted include: locally scrambled compressed content and broadcast scrambled compressed content. In the cases of locally scrambled compressed content and broadcast scrambled compressed content, in accordance with the control information 160, similarly to the case where locally scrambled, broadcast scrambled, compressed content 70 is input, the mode of operation shown in FIG. 13 produces compressed clear digital content 30.

IV. No output is to be produced.

Figure 14:
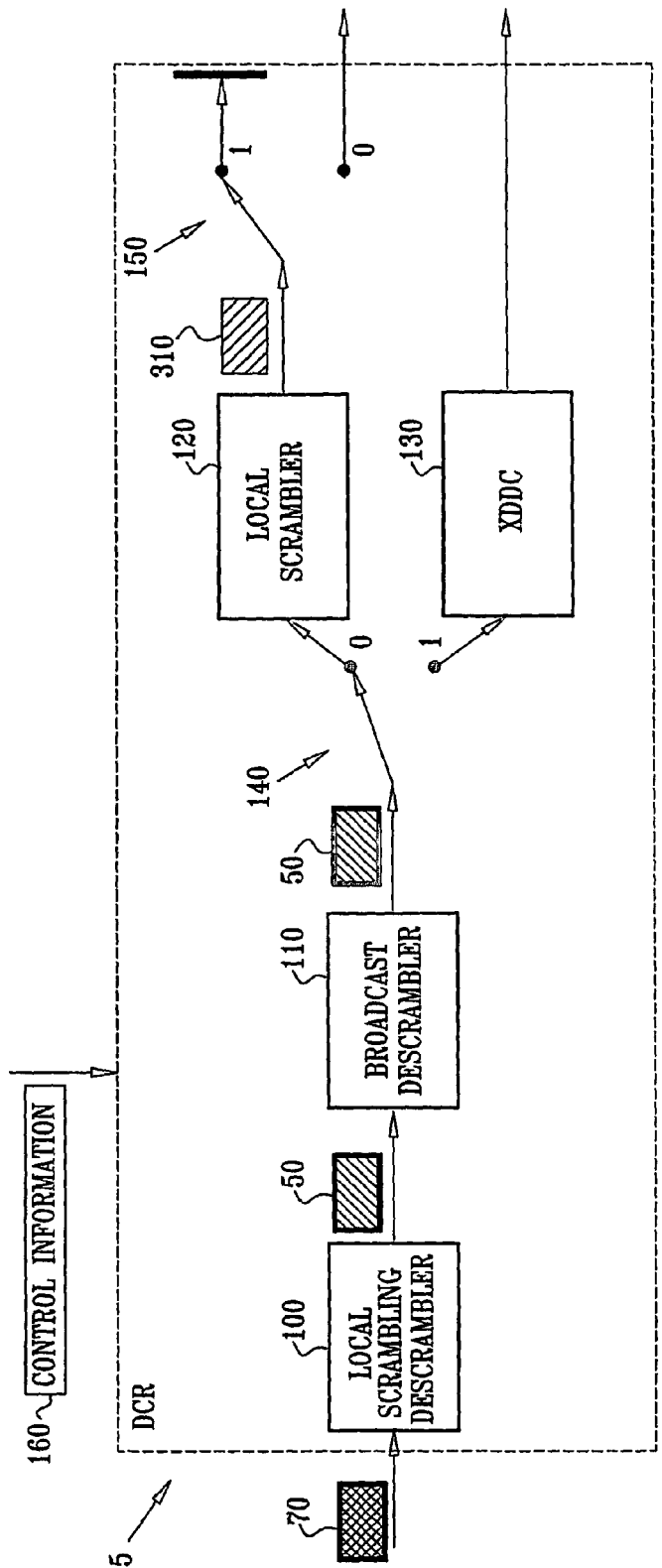
FIG. 14 is a generalized block diagram illustration of an yet another alternative mode of operation of the system of FIG. 1, illustrating a mode in which no output is to be produced.

Reference is now additionally made to FIG. 14, which is a generalized block diagram illustration of the system of FIG. 1, illustrating a mode in which no output is to be produced.

In the mode of operation in FIG. 14, locally scrambled, broadcast scrambled, compressed content 70 is input to the DCR 5. The locally scrambled, broadcast scrambled, compressed content 70 is descrambled by the local scrambling descrambler 100 producing broadcast scrambled, compressed content 50.

In the absence of valid control information 160 the broadcast scrambled, compressed content 50 is not descrambled by the broadcast descrambler 110, and is thus useless. Alternatively, if the control information 160 mandates local scrambling, the local scrambler 120 scrambles the broadcast scrambled, compressed content 50 producing locally scrambled, broadcast scrambled, compressed content 310.

It is appreciated that there exist in the mode of operation shown in FIG. 14 possible alternative inputs to the DCR 5. Inputs not depicted include: locally scrambled compressed content and broadcast scrambled compressed content. In the case of locally scrambled compressed content and broadcast scrambled compressed content, in the absence of valid control information 160, similarly to the case where locally scrambled, broadcast scrambled, compressed content 70 is input, the mode of operation shown in FIG. 14 produces no useful output.

V. Clear compressed content is attempted to be output, not in accordance with the control information 160.

Figure 15:
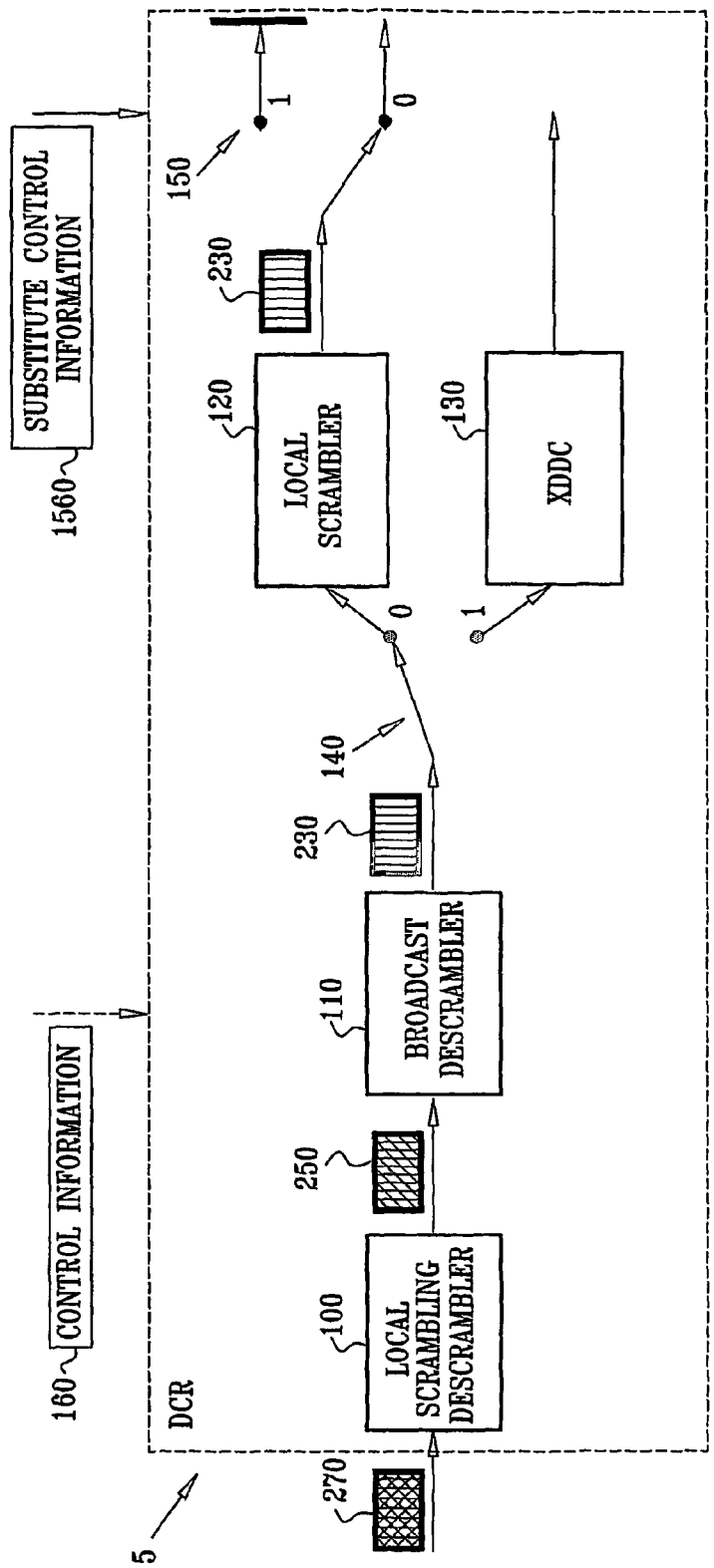
FIG. 15 is a generalized block diagram illustration of an still another alternative mode of operation of the system of FIG. 1, illustrating a mode in which clear compressed content is attempted to be output but no output is allowed.

Reference is now additionally made to FIG. 15, which is a generalized block diagram illustration of the system of FIG. 1, illustrating a mode in which clear compressed content is attempted to be output, not in accordance with the control information 160. It is appreciated that substitute control information 1560 is input to the DCR 5 by a person attempting to produce output not in accordance with control information 160.

In the mode of operation in FIG. 15, locally scrambled, broadcast scrambled, XEA scrambled, compressed content 270 is input to the DCR 5. The locally scrambled, broadcast scrambled, XEA scrambled, compressed content 270 is descrambled by the local scrambling descrambler 100, which outputs broadcast scrambled, XEA scrambled, compressed content 250.

The broadcast scrambled, XEA scrambled, compressed content 250 is descrambled by the broadcast descrambler 110, producing XEA scrambled, compressed content 230.

The first switch 140 is set in accordance with substitute control information 1560 received by the DCR 5 to output XEA scrambled, compressed content 230 to the local scrambler 120. In accordance with the substitute control information 1560 received by the DCR 5 and directed to the local scrambler 120, the XEA scrambled, compressed content 230 bypasses the local scrambler 120. The local scrambler 120 thereby preferably outputs XEA scrambled, compressed content 230. The second switch 150, in the presence of substitute control information 1560 is set to 0, so that the DCR 5 outputs XEA scrambled, compressed content 230. However, the XEA scrambled, compressed encrypted content 230 is unusable because it bypassed the XDDC 130, and the XEA encryption was never removed.

Thus, the attempt to spoof the system of FIG. 15 by providing substitute control information 1560 is rendered futile.

It is appreciated that there exist in the mode of operation shown in FIG. 15 possible alternative inputs to the DCR 5.

Inputs not depicted include: locally scrambled compressed content and broadcast scrambled compressed content. In the case of locally scrambled compressed content and broadcast scrambled compressed content, in accordance with the control information 160, similarly to the case where locally scrambled, broadcast scrambled, compressed content 70 is input, the mode of operation shown in FIG. 15 produces useless compressed encrypted output 230.

Figure 16:
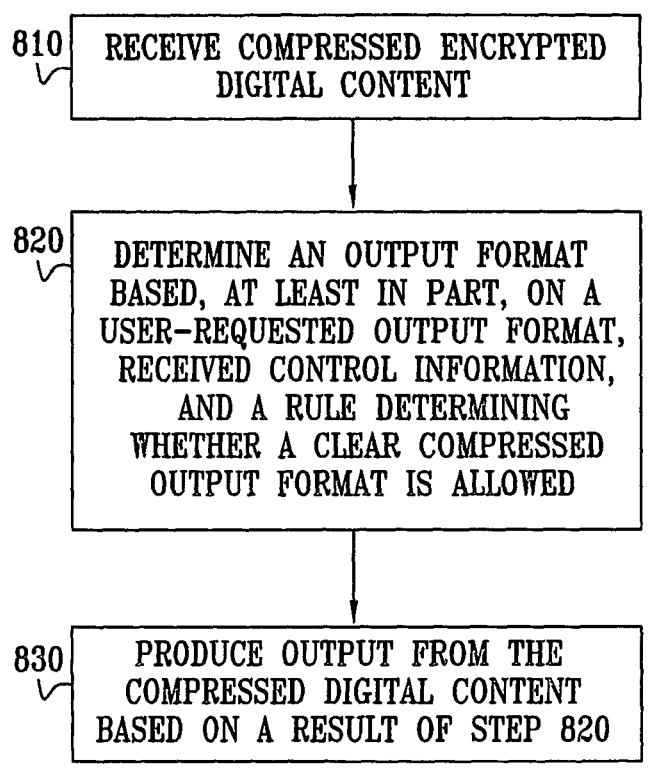
FIG. 16 is a simplified flowchart illustration of a preferred method of operation of the system of FIG. 1.

Reference is now made to FIG. 16, which is a simplified flowchart illustration of a preferred method of operation of the system of FIG. 1. The method of FIG. 16 preferably comprises the following steps:

Compressed digital content is received (step 810). If the rule referred to below in step 820 does not allow a clear compressed output format, the compressed encrypted digital content is provided in a form which prevents production of clear compressed output as explained below in step 830. For example, and without limiting the generality of the foregoing, if the rule does not allow clear compressed output, the compressed encrypted digital content is provided as XEA encrypted content, as described above in reference to FIG. 15.

An output format for the compressed digital content is determined, the output format being based, at least in part, on all of the following: a user-requested output format; received control information; and a rule determining whether a clear compressed output format is allowed (step 820).

Output is produced from the compressed digital content based on a result of step 820 (step 830). If the control information that does not permit clear compressed output has been replaced by unauthorized control information that permits clear compressed output, then the result of attempting to produce clear compressed will not be usable, as described above with reference to FIG. 15.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow.

What is claimed is:

1. A digital content receiver (DCR) comprising:
a local scrambling descrambler;
a broadcast descrambler receiving an output produced by the local scrambling descrambler;
a local scrambler;
a combined extra encryption algorithm decryptor and decoder/decompressor (XDDC); and
a switch operative to provide an output of the broadcast descrambler to exactly one of the local scrambler and the XDDC,
wherein the DCR is operative to receive control information and compressed encrypted digital content, and
at least the setting of the switch is determined, at least in part, by the control information, and
the DCR is operative to produce an output based on all of the following:
the compressed digital content;
a user-requested output format;
the received control information; and
a rule determining whether a clear compressed output format is allowed, and if the rule does not allow clear compressed output format, the compressed encrypted digital content is provided to the DCR in a form which prevents production of clear compressed output as the output of the DCR.

2. The DCR according to claim 1 and wherein the local scrambling descrambler is operative to perform exactly one of the following operations based, at least in part, on the received control information:
receive an input and produce an output substantially identical to the received input; and
receive an input, and perform descrambling on the received input, thereby producing an output.

3. The DCR according to claim 1 and wherein the local scrambler is operative to perform exactly one of the following operations based, at least in part, on the received control information:
receive an input and produce an output substantially identical to the received input; and
receive an input and perform local scrambling on the received input, thereby producing an output.

4. The DCR according to claim 1 and also comprising:
an output-producing hardware device,
wherein at least the content output unit is comprised in the hardware device.

5. The DCR according to claim 1 and wherein the hardware device is comprised in a single integrated circuit.

6. The DCR according to claim 5 and wherein the integrated circuit is comprised in a smart card.

7. The DCR according to claim 1 and also comprising:
a rendering device which renders the output sensible to at least one human sense.

8. The DCR according to claim 7 and wherein the rendering device comprises at least one of the following: an audio rendering device; a visual rendering device; and an audio/visual rendering device.

9. The DCR according to claim 1 and wherein the XDDC is operative, based, at least in part, on the received control information, to receive an input, and descramble and decode the received input in an atomic operation, thereby producing an output.

10. A content-protected personal video recorder (PVR) comprising:
the DCR of claim 1; and
a PVR unit comprising PVR storage media, the PVR unit receiving the output produced by the DCR.

11. The content-protected PVR according to claim 10 and wherein the PVR unit is operative to store the received output on the PVR storage media.

12. The content-protected PVR according to claim 10 and wherein the output produced by the DCR comprises locally scrambled output.

13. The content-protected PVR according to claim 10 and wherein the PVR unit is operative to retrieve the stored output from the PVR storage media.

14. The content-protected PVR according to claim 13 and wherein the output retrieved by the PVR comprises locally scrambled output.

15. The content-protected PVR according to claim 13 and wherein the DCR performs at least one of the following on the locally scrambled output retrieved by the PVR:
decryption; and
decompression.

16. The content-protected PVR according to claim 10 and wherein the PVR unit is operative to store received extra encryption algorithm (XEA) encrypted output on the PVR storage media.

17. The content-protected PVR according to claim 10 and wherein the output produced by the DCR comprises XEA encrypted output.

18. The content-protected PVR according to claim 10 and wherein the PVR unit is operative to retrieve the stored XEA encrypted output from the PVR storage media.

19. The content-protected PVR according to claim 18 and wherein the output retrieved by the PVR comprises XEA encrypted output.

20. The content-protected PVR according to claim 18 and wherein the DCR performs, as an atomic operation, decryption and decompression on the XEA encrypted output retrieved by the PVR.

21. A content-protected television system comprising:
the DCR of claim 1; and
a television unit, the television unit receiving the output produced by the DCR.

22. The content-protected television system according to claim 21 and wherein the television unit comprises an analog television unit.

23. The content-protected television system according to claim 21 and wherein the television unit comprises a digital television unit.

\* \* \* \* \*